US012741506B2

(12) United States Patent
Delaforge et al.

(10) Patent No.: US 12,741,506 B2
(45) Date of Patent: Sep. 22, 2026

(54) THERMAL CONDITIONING CIRCUIT

(71) Applicant: VALEO SYSTEMES THERMIQUES, La Verriere (FR)

(72) Inventors: Laurent Delaforge, La Verriere (FR); Thibaut Perrin, La Verriere (FR); Rody El Chammas, La Verriere (FR); Muriel Porto, La Verriere (FR)

(73) Assignee: Valeo Systemes Thermiques, La Verriere (FR)

( * ) Notice: Subject to any disclaimer, the term of this patent is extended or adjusted under 35 U.S.C. 154(b) by 101 days.

(21) Appl. No.: 18/550,296

(22) PCT Filed: Mar. 15, 2022

(86) PCT No.: PCT/EP2022/056765

§ 371 (c)(1),
(2) Date: Sep. 13, 2023

(87) PCT Pub. No.: WO2022/194902

PCT Pub. Date: Sep. 22, 2022

(65) Prior Publication Data

US 2024/0157762 A1 May 16, 2024

(30) Foreign Application Priority Data

Mar. 15, 2021 (FR) ....................................... 2102563

(51) Int. Cl.
*B60H 1/00* (2006.01)
*F25B 5/02* (2006.01)
(Continued)

(52) U.S. Cl.
CPC ........... *B60H 1/00899* (2013.01); *F25B 5/02* (2013.01); *F25B 41/32* (2021.01); *F25B 41/325* (2021.01);
(Continued)

(58) Field of Classification Search
CPC ...... B60H 1/00899; B60H 2001/00928; B60H 2001/00949; F25B 5/02; F25B 41/32; F25B 41/325; F25B 41/35
See application file for complete search history.

(56) References Cited

U.S. PATENT DOCUMENTS 3,313,121 A * 4/1967 Barbier ................... F25B 41/20 62/197
9,410,727 B1 * 8/2016 Boyko .................... F25B 41/20
(Continued)

FOREIGN PATENT DOCUMENTS

CN 103080670 A 5/2013
CN 103206819 A * 7/2013
(Continued)

OTHER PUBLICATIONS

European Patent Office, International Search Report (with English translation) and Written Opinion of corresponding International Application No. PCT/EP2022/056765, dated Jun. 24, 2022.
(Continued)

*Primary Examiner* — Kun Kai Ma
(74) *Attorney, Agent, or Firm* — Osha Bergman Watanabe & Burton LLP

(57) ABSTRACT

The invention relates to a thermal conditioning system including a refrigerant circuit having: a main loop including in succession: a compression device, a condenser configured to exchange heat with a first heat transfer fluid, a first expansion device, a first evaporator, a bypass branch including a second expansion device and a second evaporator. The second expansion device is a thermostatic expansion valve configured to vary a flow area for the refrigerant between a minimum flow area and a maximum flow area. The bypass branch includes a flow restriction device configured to limit a flow area for the refrigerant to a value less than the maximum flow area of the second expansion device.

16 Claims, 6 Drawing Sheets

(51) Int. Cl.

| | |
|---|---|
| ***F25B 41/32*** | (2021.01) |
| ***F25B 41/325*** | (2021.01) |
| ***F25B 41/335*** | (2021.01) |
| ***F25B 41/34*** | (2021.01) |
| ***F25B 41/35*** | (2021.01) |

(52) U.S. Cl.
CPC ............ *F25B 41/335* (2021.01); *F25B 41/34* (2021.01); *F25B 41/35* (2021.01); *B60H 2001/00928* (2013.01); *B60H 2001/00949* (2013.01)

(56) References Cited

U.S. PATENT DOCUMENTS

| | | | | |
|---|---|---|---|---|
| 11,221,164 | B2 | 1/2022 | Marasigan | |
| 2014/0318164 | A1* | 10/2014 | Hayakawa | ......... B60H 1/00921 62/222 |
| 2020/0109884 | A1* | 4/2020 | Marasigan | ............ F25B 41/325 |

FOREIGN PATENT DOCUMENTS

| | | | | |
|---|---|---|---|---|
| EP | 0907057 | A1 | 4/1999 | |
| FR | 2999690 | A1 | 6/2014 | |
| FR | 3022852 | A1 | 1/2016 | |
| JP | 2651327 | B2 * | 9/1997 | |
| JP | 2651328 | B2 * | 9/1997 | |
| JP | 2003172553 | A | 6/2003 | |
| JP | 2004309081 | A * | 11/2004 | ............ F25B 41/335 |
| JP | 2006300508 | A * | 11/2006 | |
| JP | 3879301 | B2 * | 2/2007 | |
| JP | 4503471 | B2 * | 7/2010 | |
| JP | 2017150730 | A * | 8/2017 | |
| JP | 2017150731 | A * | 8/2017 | |
| WO | WO-2008036079 | A2 * | 3/2008 | ............ F25B 41/385 |
| WO | 2011128527 | A1 | 10/2011 | |

OTHER PUBLICATIONS

Office Action issued by the CNIPA for corresponding Chinese Patent Application No. 202280035210.7, mailed Jul. 10, 2026 (9 pages).

* cited by examiner

THERMAL CONDITIONING CIRCUIT

TECHNICAL FIELD

The present invention concerns the field of thermal conditioning systems. These thermal conditioning systems can be in particular be provided on motor vehicles. In this type of application, these systems make it possible to ensure the thermal regulation of various members or modules of the vehicle. The heat exchanges are mainly managed by the compression and expansion of a refrigerant circulating in a circuit in which a plurality of heat exchangers are positioned.

BACKGROUND OF THE INVENTION

It is known practice to simultaneously ensure thermal regulation of two members or modules of the vehicle, such as the passenger compartment or an electrical energy storage battery, in the case of an electrically powered vehicle. To this end, the refrigerant circulates in two branches of the refrigerant circuit positioned in parallel and each comprising an evaporator. The refrigerant can undergo expansion in each of the evaporators, which makes it possible to absorb heat and ensure thermal regulation of the member or module associated with this evaporator.

It is also known practice to control the expansion of the refrigerant in an evaporator by means of a thermostatic expansion valve. Such an expansion valve ensures regulation of the overheating of the refrigerant leaving the evaporator without requiring an electrical command or electrical signal. A thermostatic expansion valve is both cheap to manufacture and simple to incorporate into a thermal conditioning system.

When two evaporators positioned in parallel are operating simultaneously, each absorbing a significantly different amount of thermal power from the other evaporator, it can be difficult to regulate the thermal conditioning system. When an evaporator provided with a standard thermostatic expansion valve must operate to supply significantly less refrigerating power than its rated refrigeration capacity, operation tends to be unstable. In these conditions, a standard thermostatic expansion valve tends to either allow no refrigerant flow rate into the evaporator, or allow an excessive flow rate in order to supply the required refrigerating power. In practice, regulation is achieved by a succession of phases of stopping the circulation of the refrigerant in the evaporator and phases of restarting the circulation of the refrigerant. It is then difficult to obtain a stable, uniform temperature in the evaporator. If this evaporator is used to cool the elements of an electrical energy storage battery, these temperature fluctuations are detrimental to the performance and long-term reliability of the battery.

One aim of the present invention is thus to provide a thermal conditioning system that can operate in a stable manner, even when an evaporator controlled by a thermostatic expansion valve must operate to supply low thermal power, significantly lower than the rated power.

BRIEF SUMMARY OF THE INVENTION

To this end, the present invention proposes a thermal conditioning system comprising a refrigerant circuit configured to circulate a refrigerant, the refrigerant circuit comprising:

- a main loop comprising in succession in the direction of travel of the refrigerant:

- a compression device,
  - a condenser configured to exchange heat with a first heat transfer fluid,
  - a first expansion device,
  - a first evaporator,
- a bypass branch connecting a first junction point positioned on the main loop downstream of the condenser and upstream of the first expansion device to a second junction point positioned on the main loop downstream of the first evaporator and upstream of the compression device, the bypass branch comprising a second expansion device and a second evaporator,
- wherein the second expansion device is a thermostatic expansion valve configured to vary a flow area for the refrigerant between a minimum flow area and a maximum flow area,
- and wherein the bypass branch comprises a flow restriction device configured to limit a flow area for the refrigerant to a value less than the maximum flow area of the second expansion device.

The flow restriction device makes it possible to limit the refrigerant flow rate sent to the second evaporator, without modifying the elements of the second expansion device that contribute to the regulation of the flow area for the refrigerant. When the thermal conditioning system is operating at an operating point at which the second evaporator is supplying low cooling power compared to its maximum cooling power, the flow restriction makes it possible to obtain operation with an even refrigerant flow rate in the second evaporator. The temperature within the second evaporator undergoes fewer variations over time and can be controlled more accurately.

The features listed in the following paragraphs can be implemented independently of one another or in any technically possible combination:

The thermal conditioning system can be a thermal conditioning system for a motor vehicle.

According to one embodiment, the second expansion device is positioned upstream of the second evaporator.

According to one exemplary embodiment, the first heat transfer fluid is an air stream outside a passenger compartment of a motor vehicle.

According to another exemplary embodiment, the first heat transfer fluid is a heat transfer liquid.

The first evaporator is configured to exchange heat with a second heat transfer fluid.

According to one embodiment, the second heat transfer fluid is an air stream inside the passenger compartment of the vehicle.

The second evaporator can be thermally coupled to an element of an electric drive train of the vehicle.

The element of the electric drive train can be an electrical energy storage battery.

According to one embodiment, the second evaporator is adjacent to the electrical energy storage battery.

The element of the electric drive train can be an electronic module for controlling an electric drive motor of the vehicle.

The flow restriction device is configured to limit a flow area for the refrigerant to a value of less than 30% of the maximum flow area of the second expansion device.

The first expansion device can be an electronic expansion valve, a thermostatic expansion valve, or a calibrated orifice.

According to one aspect of the invention, the second expansion device comprises a first refrigerant circulation duct configured to supply the second evaporator and a second refrigerant circulation duct configured to receive the refrigerant at the outlet of the second evaporator, and the second expansion device comprises a movable shut-off device configured to vary a flow area of the first duct under the action of a thermally sensitive element positioned in the second duct.

According to one embodiment, the flow restriction device is positioned in the second duct.

The minimum flow area of the second expansion device is zero.

According to one embodiment of the thermal conditioning system, the flow restriction device is positioned upstream of the thermally sensitive element.

According to another embodiment of the thermal conditioning system, the flow restriction device is positioned downstream of the thermally sensitive element.

According to one embodiment of the thermal conditioning system, the flow restriction device is a diaphragm comprising a calibrated orifice.

According to one exemplary embodiment, the diaphragm is cylindrical. The calibrated orifice is cylindrical and coaxial with an axis of the diaphragm.

According to one aspect of the invention, a flow area of the calibrated orifice is between 0.5% and 10% of the maximum flow area of the second expansion device.

According to one exemplary embodiment, the second expansion device comprises a recess for receiving the diaphragm, the diaphragm being positioned in the receiving recess.

According to another exemplary embodiment, the refrigerant circuit comprises a hose connected to the second expansion device, the hose comprising a flange for connection with the second expansion device, and the flange comprises a recess for receiving the diaphragm, the diaphragm being positioned in the receiving recess.

According to one embodiment of the thermal conditioning system, the flow restriction device is positioned downstream of the second expansion device.

According to one embodiment of the thermal conditioning system, the flow restriction device is a valve comprising a fluid circulation duct and a movable shut-off device positioned in the duct, the movable shut-off device being configured to vary a flow area of the duct of the valve.

According to one embodiment, the flow restriction device comprises an electric motor configured to move the movable shut-off device.

The electric motor can be a DC motor.

The electric motor can be a stepping motor.

According to one embodiment, the flow restriction device and the second expansion device are adjacent to each other.

According to one embodiment, the flow restriction device and the second expansion device form part of the same body. The body can for example be a cast body.

According to one exemplary embodiment of the invention, the fluid circulation duct of the flow restriction device is coaxial with the second fluid circulation duct of the second expansion device.

According to another embodiment, the flow restriction device and the second expansion device are connected by a hose.

For example, the hose connecting the flow restriction device and the second expansion valve has a length of less than 10 centimeters.

According to one exemplary embodiment, the movable shut-off device of the flow restriction device is a rotatable ball comprising a through-hole configured to form a fluid circulation duct portion.

For example, an axis of rotation of the rotatable ball and an axis of the fluid circulation duct of the flow restriction device are perpendicular to each other.

An axis of rotation of the rotatable ball and an axis of the through-hole are perpendicular to each other.

According to another exemplary embodiment, the movable shut-off device of the flow restriction device is a rotatable flap configured to pivot in the fluid circulation duct.

According to yet another exemplary embodiment, the movable shut-off device of the flow restriction device is a translatable valve.

BRIEF DESCRIPTION OF THE DRAWINGS

Further features, details and advantages will become apparent on reading the detailed description below, and on studying the appended drawings, in which.

DETAILED DESCRIPTION OF THE INVENTION

Figure 1:
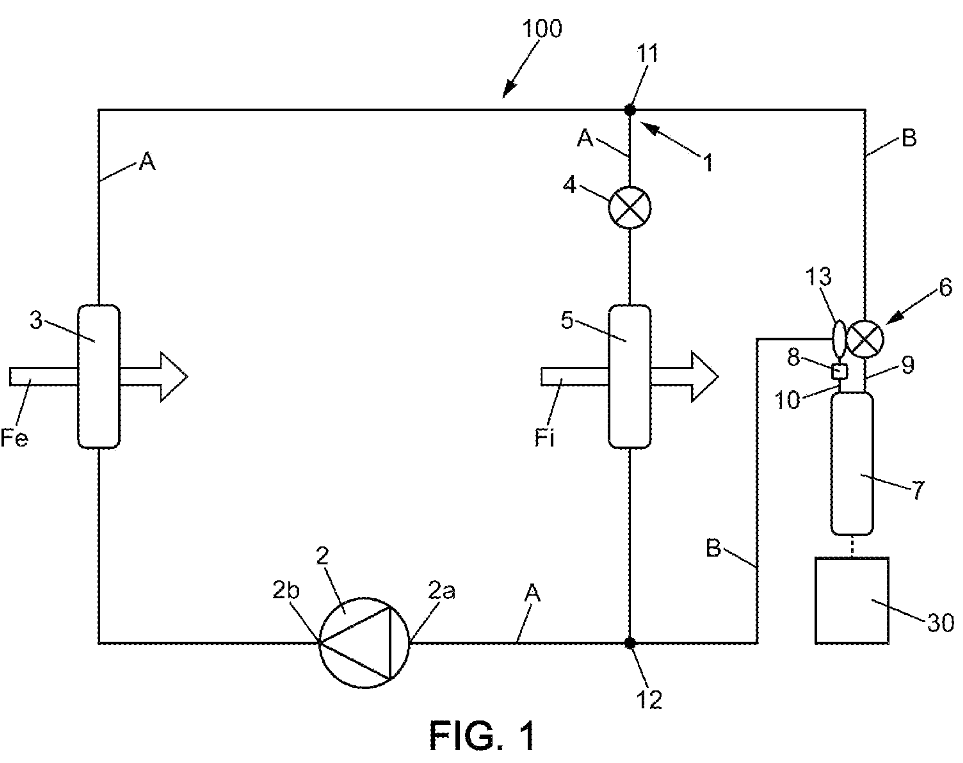
FIG. 1 is a schematic depiction of a thermal conditioning system according to the invention.

In order to make the figures easier to read, the different elements are not necessarily shown to scale. In these figures, identical elements have the same reference signs. Some elements or parameters can be given ordinal numbers, in other words designated for example first element or second element, or first parameter and second parameter, etc. The purpose of this ordinal numbering is to make a distinction between elements or parameters that are similar but not identical. This ordinal numbering does not imply any priority of one element, or parameter, over another and the designations can be interchanged.

In the description below, the term "a first element upstream of a second element" means that the first element is placed before the second element with respect to the direction of circulation, or travel, of a fluid. Similarly, the term "a first element downstream of a second element" means that the first element is placed after the second element in relation to the direction of circulation, or travel, of the fluid concerned. In the case of the refrigerant circuit, the expression "a first element is upstream of a second element" means that the refrigerant travels in succession through the first element and then the second element, without passing through the compression device 2. In other words, the refrigerant leaves the compression device 2, passes through one or more elements and then passes through the first element, then the second element, then returns to the inlet 2*a* of the compression device 2, optionally having passed through further elements.

When it is specified that a sub-system comprises a given element, this does not rule out the presence of other elements in this sub-system.

An electronic control unit, not shown in the figures, receives information from various sensors measuring in particular the characteristics of the refrigerant at various points on the circuit. The electronic unit also receives the setpoints requested by the occupants of the vehicle, such as the desired temperature inside the passenger compartment for example. The electronic unit implements control laws for operating the various actuators, in order to control the thermal conditioning system 100.

The thermal conditioning system 100 comprises a compression device 2 making it possible to pressurize the refrigerant and circulate it in the refrigerant circuit 1. The compression device 2 can be an electric compressor, that is a compressor with moving parts driven by an electric motor. The compression device 2 comprises a side for taking in low-pressure refrigerant, also called the inlet 2*a* of the compression device 2, and a side for discharging high-pressure refrigerant, also called the outlet 2*b* of the compression device 2. The internal moving parts of the compressor 2 take the refrigerant from low pressure on the inlet 2*a* side to high pressure on the outlet 2*b* side. After expansion in one or more expansion members of the circuit 1, the refrigerant returns to the inlet of the compressor 2 and begins a new thermodynamic cycle.

Each junction point allows the refrigerant to enter one or other of the circuit portions that meet at this junction point. The refrigerant is distributed between the two circuit portions meeting at a junction point by adjusting the opening or closure of the stop valves or expansion devices included on each of the two branches. In other words, each junction point is a means of redirecting the fluid arriving at this junction point.

The refrigerant used by the refrigerant circuit 1 is in this case a chemical fluid such as R1234yf. Other refrigerants could be used, such as R134a for example.

FIG. 1 shows a thermal conditioning system 100 comprising a refrigerant circuit 1 configured to circulate a refrigerant, the refrigerant circuit 1 comprising:

- a main loop A comprising in succession in the direction of travel of the refrigerant:
  - a compression device 2,
  - a condenser 3 configured to exchange heat with a first heat transfer fluid,
  - a first expansion device 4,
  - a first evaporator 5,
- a bypass branch B connecting a first junction point 11 positioned on the main loop A downstream of the condenser 3 and upstream of the first expansion device 4 to a second junction point 12 positioned on the main loop A downstream of the first evaporator 5 and upstream of the compression device 2, the bypass branch B comprising a second expansion device 6 and a second evaporator 7,
- wherein the second expansion device 6 is a thermostatic expansion valve configured to vary a flow area for the refrigerant between a minimum flow area Smin and a maximum flow area Smax,
- and wherein the bypass branch B comprises a flow restriction device 8 configured to limit a flow area for the refrigerant to a value less than the maximum flow area Smax of the second expansion device 6.

In the example illustrated, the thermal conditioning system 100 is a thermal conditioning system for a motor vehicle.

The second expansion device 6 is positioned upstream of the second evaporator 7. This means that the refrigerant is expanded upstream of the second evaporator 7.

The flow restriction device 8 is separate from the second expansion device 6.

The condenser 3 is a heat exchanger configured to condense the refrigerant. The heat released by the condensing of the refrigerant is transferred to the first heat transfer fluid.

The first heat transfer fluid is in this case a stream of air Fe outside a passenger compartment of a motor vehicle. Outside air stream Fe is given to mean an air stream not intended for the passenger compartment. In other words, this air stream remains outside the vehicle. A motor-fan unit positioned in immediate proximity to the condenser 3, not shown, can be activated in order to increase the flow rate of the outside air stream Fe if necessary.

According to one example, not shown, the first heat transfer fluid is a heat transfer liquid. In this case, the heat transfer liquid can circulate in a heat transfer liquid circuit comprising a heat exchanger positioned in the passenger compartment of the vehicle. The passenger compartment of the vehicle is in particular heated by this heat exchanger.

The first evaporator 5 is configured to exchange heat with a second heat transfer fluid. In this case, the second heat transfer fluid is a stream of air Fi inside the passenger compartment of the vehicle.

Inside air stream Fi is given to mean an air stream intended for the passenger compartment of the motor vehicle. This inside air stream can circulate in a heating, ventilation and air conditioning (HVAC) installation. This installation is not shown in the figures. As above, another motor-fan unit, also not shown in the figures, is positioned in the heating installation in order to increase the flow rate of the inside air stream Fi on the first evaporator 5 if necessary.

In this case, the second evaporator 7 is thermally coupled to an element 30 of an electric drive train of the vehicle.

The element 30 of the electric drive train is for example an electrical energy storage battery 30. Heat is exchanged directly between the electrical energy storage battery 30 and the second evaporator 7, that is, without the use of another heat transfer fluid. The wall of the second evaporator 7 makes it possible to absorb the heat from the battery. The second evaporator 7 is adjacent to the electrical energy storage battery 30.

According to one variant, the element 30 of the electric drive train can be an electronic module for controlling an electric drive motor of the vehicle.

The second junction point 12 is positioned upstream of the compression device 2. This means that the second junction point 12 is positioned upstream of an inlet 2*a* of the compression device 2.

The flow area for the refrigerant is defined as the area of a cross-section of the refrigerant circuit 1. The refrigerant circuit 1 comprises a plurality of tubes and hoses connected together. The flow area for the refrigerant 1 can vary at different points of the refrigerant circuit. In the case of a cylindrical tube, the flow area is the area of a disk having the same diameter as the inner diameter of the tube.

Figure 10:
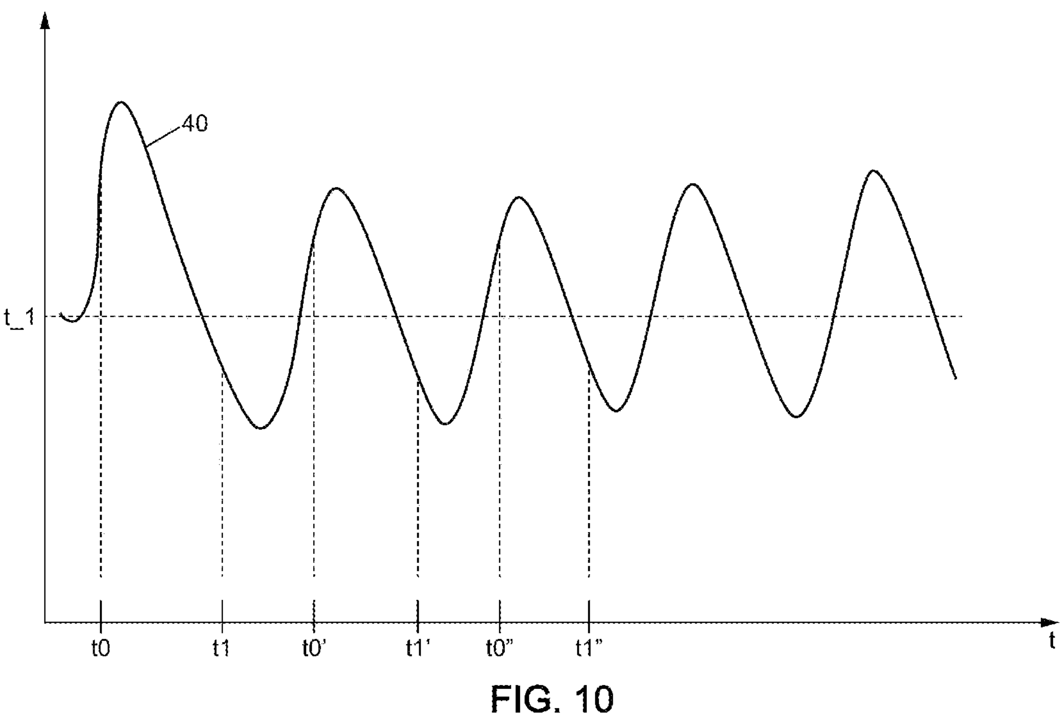
FIG. 10 is a curve showing the variation over time of the operation of a thermal conditioning system according to the prior art.

The flow restriction device 8 makes it possible to limit the refrigerant flow rate sent to the second evaporator 7, without having to modify the elements of the second expansion device 6 that contribute to the regulation of the flow area for the refrigerant. When the thermal conditioning system 100 is operating at an operating point at which the second evaporator 7 is supplying low cooling power relative to its maximum cooling power, the flow restriction 8 makes it possible to obtain operation with an even refrigerant flow rate in the second evaporator 7. This scenario corresponds for example to a situation in which the battery 30 needs to receive slight cooling. This scenario can arise when the ambient temperature is moderate and the power dissipated is also moderate, for example when the vehicle is not exceeding 50 km/h on a flat road and with a rated gross vehicle weight. FIG. 10 schematically illustrates the operation of a thermal conditioning system according to the prior art. The curve 40 corresponds to the variation of the temperature at a given point of the second evaporator 7. The refrigerant temperature setpoint in the second evaporator is T_1. At time t0, the temperature is greater than the setpoint and a cooling setpoint is issued. Soon after time t0, the second expansion device 6, which is a thermostatic expansion valve, opens and circulates refrigerant in the second evaporator 7. The temperature decreases. At time t1, the temperature is less than the setpoint T_1 and continues to fall, so the refrigerant flow rate must decrease. In practice, the second expansion device 6 closes and prevents the refrigerant from circulating in the second evaporator 7. The temperature therefore rises again. At time t0', the temperature is once again different from the setpoint T_1 and the second expansion device 6 once again circulates refrigerant in the second evaporator 7. As above, the refrigerant continues to circulate until time t1', when the temperature becomes too low, and the circulation of the refrigerant is once again interrupted. The phenomenon is repeated periodically if the cooling requirement does not change. In the same way, time t0" corresponds to a phase of restarting the circulation of refrigerant and time t1" corresponds to the start of a phase of shutting off the circulation of refrigerant. The temperature in the second evaporator 7 oscillates and the temperature regulation is inaccurate.

Figure 11:
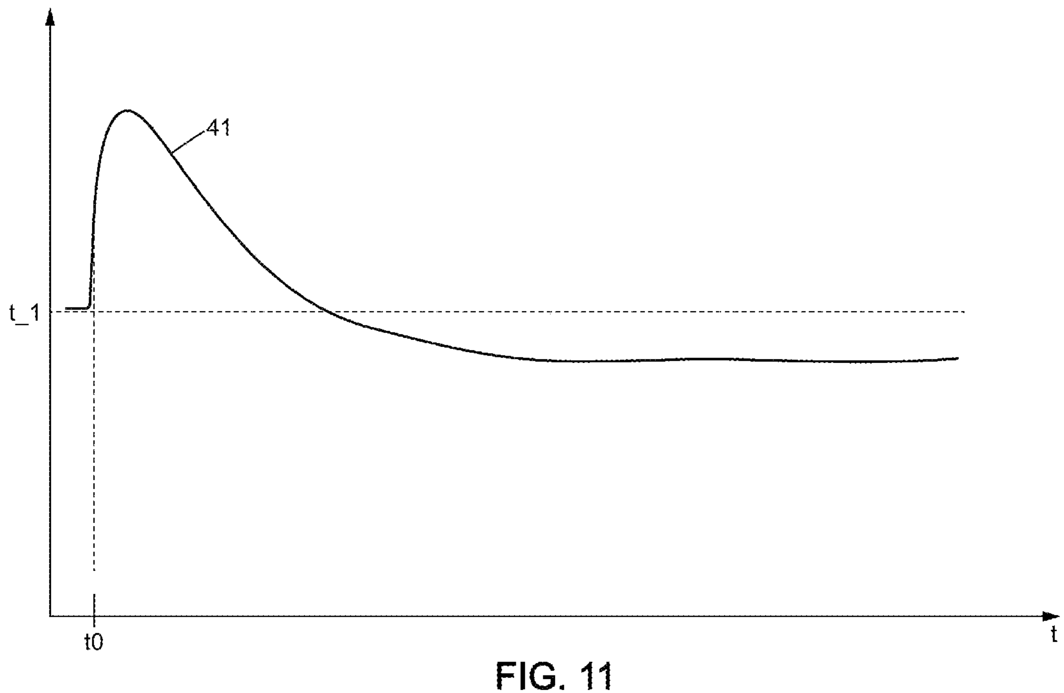
FIG. 11 is a curve showing the variation over time of the operation of a thermal conditioning system according to the invention.

FIG. 11 illustrates the operation of a thermal conditioning system according to the invention, in the same conditions in terms of cooling requirement and temperature setpoint. As above, time t0 corresponds to the time when the thermostatic expansion valve 6 opens and circulates refrigerant in the second evaporator 7. Due to the flow restriction device 8, the refrigerant flow rate can be sufficiently low, while being non-zero, to provide the cooling power sought by the regulation. The thermostatic expansion valve 6 then operates in an opening range in which the flow rate can be regulated without going as far as phases of zero-flow rate operation. The circulation of refrigerant can be continuously maintained. The temperature within the second evaporator 7 undergoes fewer variations over time and can be controlled more accurately.

The flow restriction device 8 is configured to limit a flow area for the refrigerant to a value of less than 30% of the maximum flow area Smax of the second expansion device 6. For example, for a flow diameter of 18 millimeters, the corresponding flow area is approximately 254 square millimeters. In the case of a flow restriction device comprising a calibrated orifice with a diameter of 4 millimeters, the flow area is approximately 12.5 square millimeters, which represents approximately 5% of the maximum flow area.

The first expansion device 4 can be an electronic expansion valve, a thermostatic expansion valve, or a calibrated orifice.

An electronic expansion valve comprises an electric motor that makes it possible to move a movable shut-off device that controls the flow area made available for the refrigerant. At least one position sensor makes it possible to control the position of the movable shut-off device. The electronic control unit controls the electronic expansion valve.

The second expansion device 6 is a thermostatic expansion valve. As illustrated in FIGS. 2 to 9, the second expansion device 6 comprises a first refrigerant circulation duct 9 configured to supply the second evaporator 7 and a second refrigerant circulation duct 10 configured to receive the refrigerant at the outlet of the second evaporator 7. The second expansion device 6 comprises a movable shut-off device 14 configured to vary a flow area of the first duct 9 under the action of a thermally sensitive element 13 positioned in the second duct 10.

Figure 2:
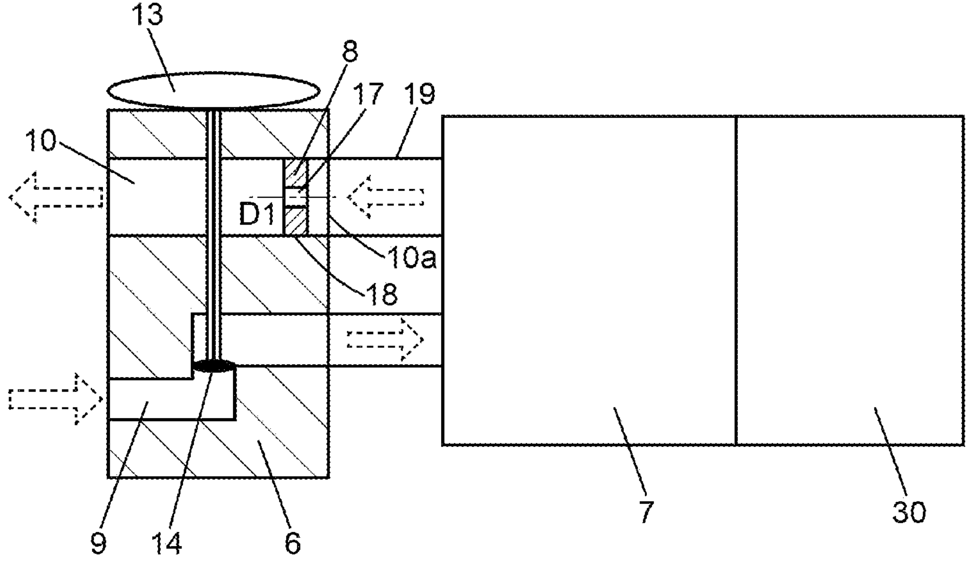
FIG. 2 is a partial schematic depiction of a thermal conditioning system according to a first embodiment of the invention.
Figure 3:
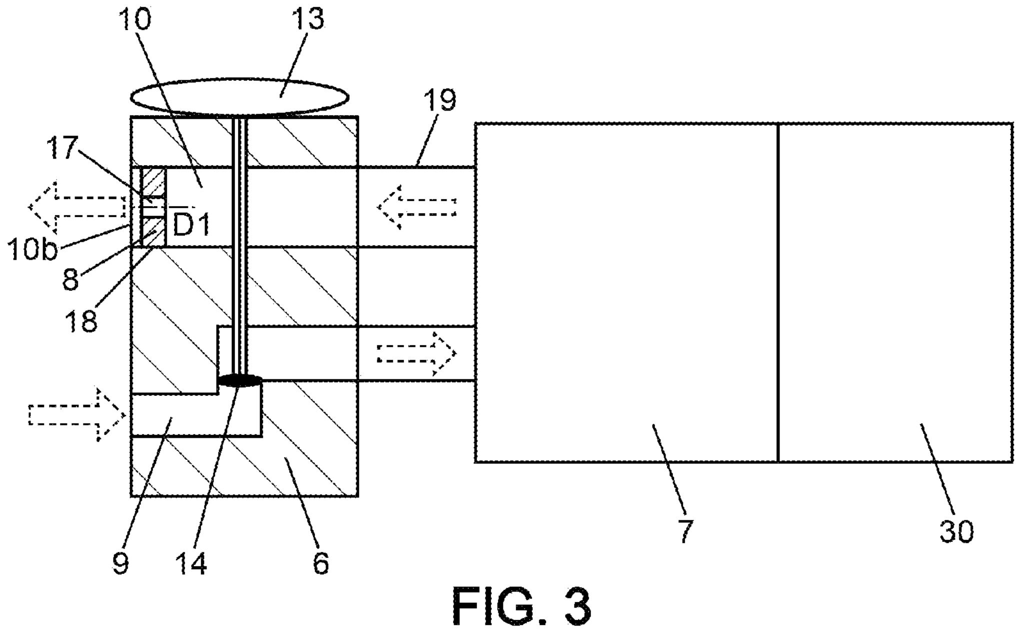
FIG. 3 is a partial schematic depiction of a thermal conditioning system according to a variant of the first embodiment.

According to a first embodiment, illustrated in FIG. 2 and FIG. 3, the flow restriction device 8 is positioned in the second duct 10.

In other words, the flow restriction device 8 is incorporated into the second expansion device 6.

In this case, the first refrigerant circulation duct 9 and the second refrigerant circulation duct 10 form part of a single cast body.

The minimum flow area Smin of the second expansion device 6 is zero.

In other words, when the movable shut-off device 14 is in the position in which the flow area of the second expansion device 6 is zero, the refrigerant flow rate passing through the second expansion device 6 is zero, excluding leaks. Leaks are considered to be negligible relative to the refrigerant flow rate when the thermal conditioning system is operating.

The movable shut-off device 14 of the second expansion device 6 moves under the action of a return spring 15 and under the action of the thermally sensitive element 13. As particularly illustrated in FIGS. 5 and 6, the thermally sensitive element 13 comprises a membrane 16 subject to the pressure of a fluid positioned in a receptacle positioned in the stream of refrigerant leaving the second evaporator 7. The fluid is thus substantially at the same temperature as the refrigerant leaving the evaporator. When the temperature of the refrigerant is sufficiently high, the fluid contained in the receptacle exerts sufficient force on the membrane 16 to move the movable shut-off device 14 and increase the refrigerant flow area. The refrigerant flow rate therefore increases, which increases the heat absorbed in the evaporator and decreases the temperature of the refrigerant leaving the evaporator. Regulation is thus ensured. The thermally sensitive element 13 is subject to a temperature that is substantially equal to the temperature of the refrigerant leaving the second evaporator 7.

According to the variant of the first embodiment of the thermal conditioning system illustrated in FIG. 2, the flow restriction device 8 is positioned upstream of the thermally sensitive element 13.

The flow restriction device 8 is positioned downstream of an inlet 10*a* of the second duct 10 and upstream of the thermally sensitive element 13. In other words, the refrigerant leaving the second evaporator 7 first passes through the flow restriction device 8 before reaching the thermally sensitive element 13.

According to another variant of the first embodiment, illustrated in FIG. 3, the flow restriction device 8 is positioned downstream of the thermally sensitive element 13.

The flow restriction device 8 is positioned downstream of the thermally sensitive element 13 and upstream of an outlet 10*b* of the second duct 10. In other words, the refrigerant leaving the second evaporator 7 first passes through the thermally sensitive element 13 before reaching the flow restriction device 8.

Figure 4:
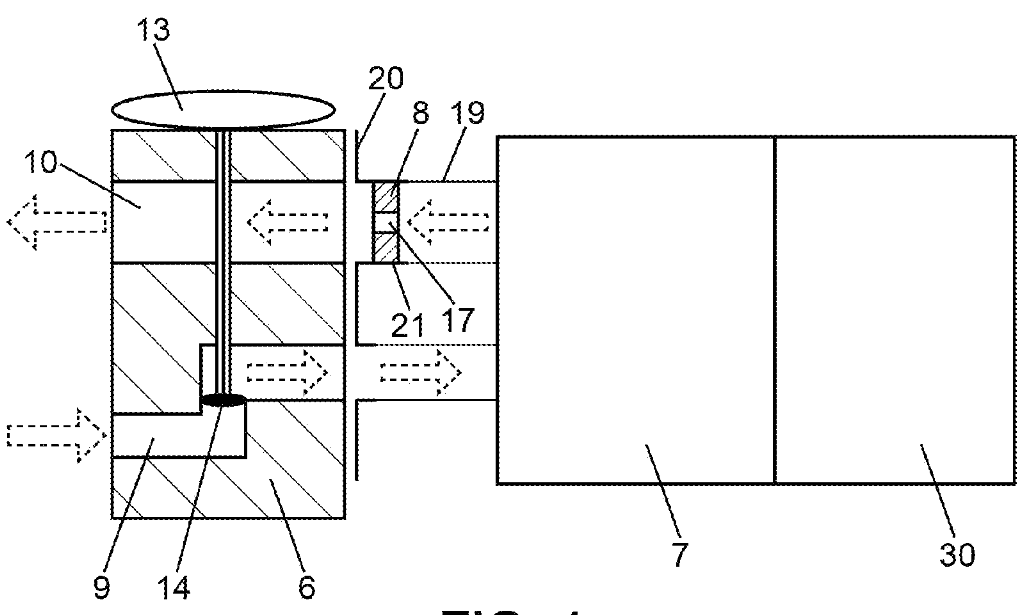
FIG. 4 is a partial schematic depiction of a thermal conditioning system according to another variant of the first embodiment.

According to the first embodiment of the thermal conditioning system, illustrated in FIGS. 2 to 4, the flow restriction device 8 is a diaphragm comprising a calibrated orifice 17. The diaphragm is generally disk-shaped. The thickness of the disk is less than the radius thereof.

A flow area of the calibrated orifice 17 is fixed. In other words, the flow area of the calibrated orifice 17 cannot be modified during the operation of the thermal conditioning system 100. The flow area of the flow restriction device 8 can only be modified by dismantling and modifying the internal elements of the device, in order to fit a diaphragm having different characteristics.

According to the example illustrated, the diaphragm is cylindrical. The calibrated orifice 17 is cylindrical and coaxial with an axis D1 of the diaphragm. The diaphragm is for example made from metal. The calibrated orifice can for example be obtained by drilling. The flow restriction device 8 is simple to manufacture and develop.

A flow area of the calibrated orifice 17 is between 0.5% and 10% of the maximum flow area Smax of the second expansion device 6.

According to one exemplary embodiment illustrated in FIG. 2 as well as FIG. 3, the second expansion device 6 comprises a recess 18 for receiving the diaphragm, the diaphragm being positioned in the receiving recess 18. The interface between the recess 18 and the diaphragm is sealed. In other words, the refrigerant can only pass through the calibrated orifice 17. The recess 18 can for example be obtained by machining the cast body of the second expansion device 6.

According to another exemplary embodiment, illustrated in FIG. 4, the refrigerant circuit 1 comprises a hose 19 connected to the second expansion device 6, the hose 19 comprising a flange 20 for connection with the second expansion device 6, and the flange 20 comprises a recess 21 for receiving the diaphragm, the diaphragm being positioned in the receiving recess 21. In this case, no modification of the second expansion device 6 is necessary to install the diaphragm forming the flow restriction.

Figure 9:
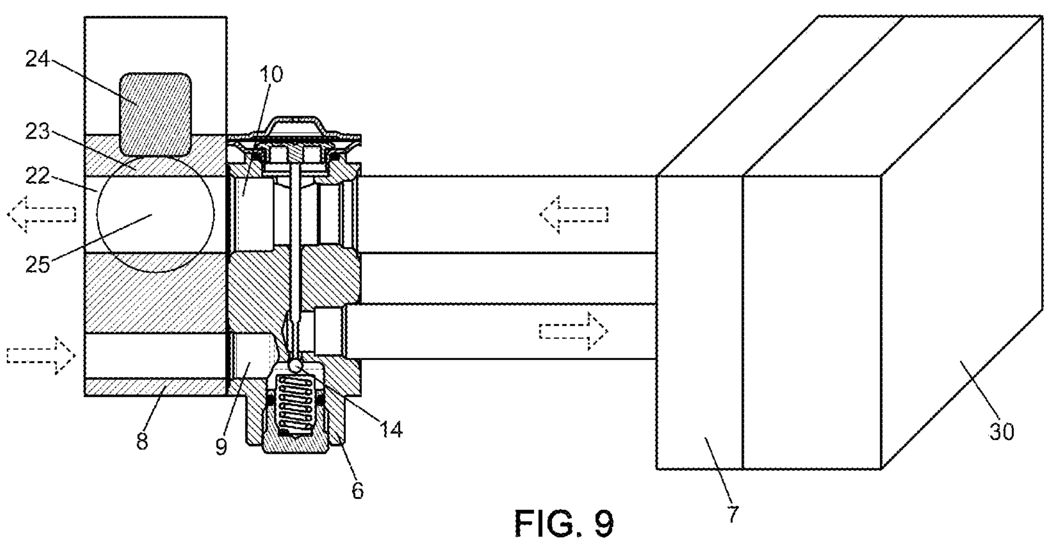
FIG. 9 is a partial schematic depiction of a thermal conditioning system according to yet another variant of the second embodiment.

According to one embodiment of the thermal conditioning system, illustrated in FIG. 9, the flow restriction device 8 is positioned downstream of the second expansion device 6. In other words, the flow restriction device 8 is positioned downstream of the second refrigerant circulation duct 10 receiving the refrigerant leaving the second evaporator 7.

According to a second embodiment of the thermal conditioning system, illustrated in FIGS. 5 to 9, the flow restriction device 8 is a valve comprising a fluid circulation duct 22 and a movable shut-off device 23 positioned in the duct, the movable shut-off device 23 being configured to vary a flow area of the duct 22 of the valve. In other words, the second embodiment differs from the first embodiment in that the area of the flow restriction can vary over time in order to adapt to the temperature regulation requirements. When the cooling requirement corresponds to operation close to the maximum thermal power, the movable shut-off device 23 can adopt a position such that the duct 22 is fully open, so that the refrigerant flow rate is not limited. When the cooling requirement corresponds to low power relative to the rated thermal power, the movable shut-off device restricts the refrigerant flow area according to the principle described above. Optionally, when the valve is sealed when the movable shut-off device 23 is in the closed position, a stop function is available. In this case, it is not necessary to provide another stop valve. In particular, the thermostatic expansion valve 6 does not then need to incorporate a stop valve.

The flow restriction device 8 comprises an electric motor 24 configured to move the movable shut-off device 23. The electric motor 24 can be a DC motor. The electric motor 24 can be a stepping motor.

Figure 5:
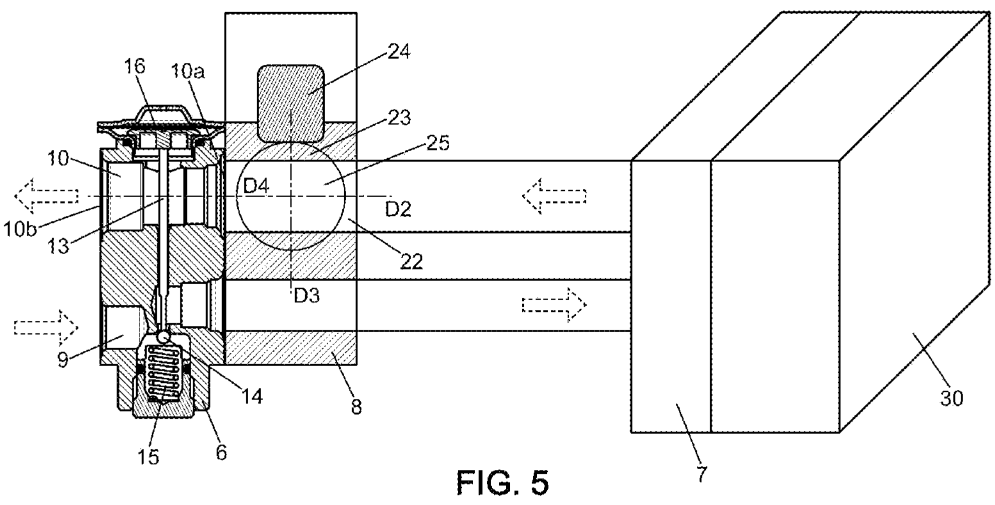
FIG. 5 is a partial schematic depiction of a thermal conditioning system according to a second embodiment of the invention.
Figure 6:
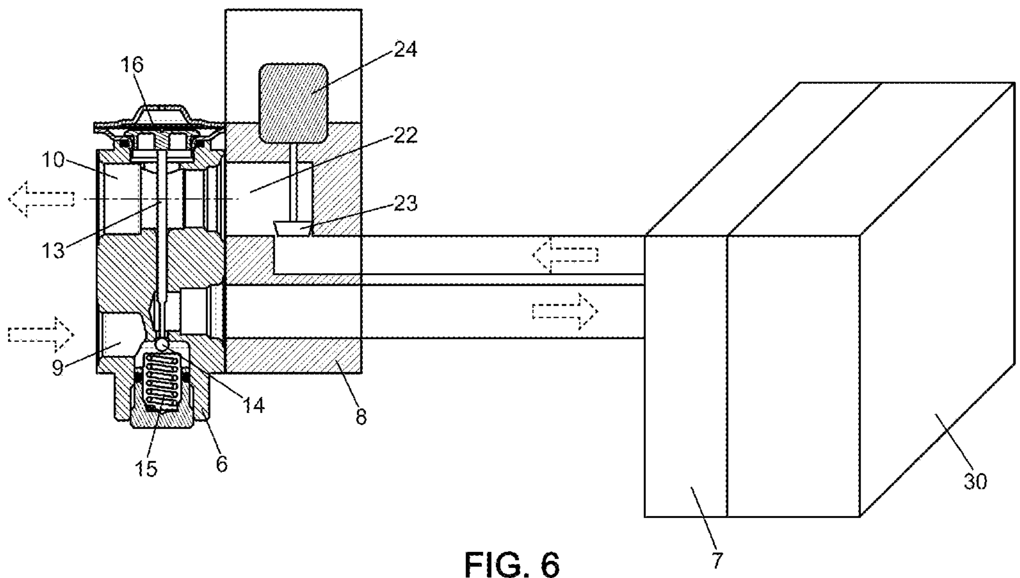
FIG. 6 is a partial schematic depiction of a thermal conditioning system according to a variant of the second embodiment.

In the variants in FIGS. 5, 6 and 9, the flow restriction device 8 and the second expansion device 6 are adjacent to each other. Adjacent is given to mean that the flow restriction device 8 and the second expansion device 6 are connected to each other, optionally with a seal inserted between them. The flow restriction device 8 and the second expansion device 6 can be coupled to each other, for example by screws passing through a coupling flange on each device.

According to one embodiment, not shown, the flow restriction device 8 and the second expansion device 6 form part of the same body. The body can for example be a cast body, that is, obtained by molding a metal alloy. The different fluid flow ducts and the different recesses receiving the components of the second expansion device 6 and of the flow restriction device 8 are produced in a single body.

Figure 7:
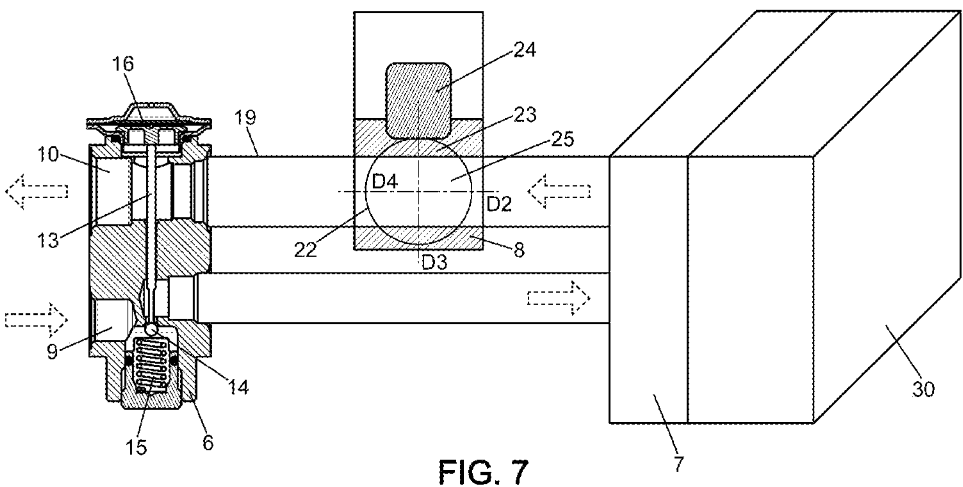
FIG. 7 is a partial schematic depiction of a thermal conditioning system according to another variant of the second embodiment.
Figure 8:
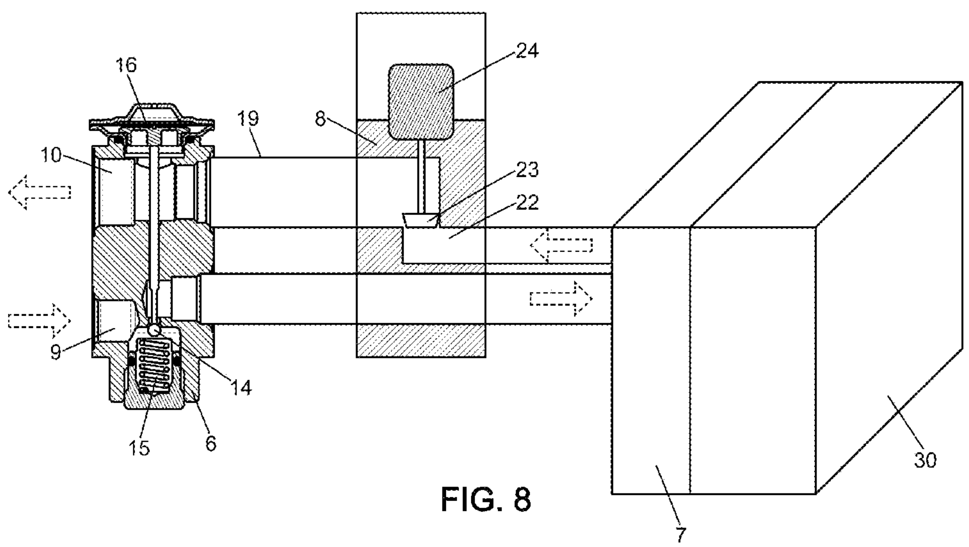
FIG. 8 is a partial schematic depiction of a thermal conditioning system according to another variant of the second embodiment.

According to the variants in FIG. 7 and FIG. 8, the flow restriction device 8 and the second expansion device 6 are connected by a hose 19. For example, the hose connecting the flow restriction device 8 and the second expansion device 6 has a length of less than 10 centimeters.

According to the variant in FIG. 5, the fluid circulation duct 22 of the flow restriction device 8 is coaxial with the second fluid circulation duct 10 of the second expansion device 6. The duct 22 and the duct 10 both extend along the axis D2.

Different types of movable shut-off device are possible. According to one exemplary embodiment, illustrated in FIG. 5 as well as in FIG. 7, the movable shut-off device 23 of the flow restriction device 8 is a rotatable ball comprising a through-hole 25 configured to form a fluid circulation duct portion.

The rotatable ball 23 is connected to a rotation shaft with an axis D3. The axis of rotation D3 of the rotatable ball and an axis D2 of the fluid circulation duct 22 of the flow restriction device 8 are perpendicular to each other. The through-hole 25 is for example cylindrical and extends along an axis D4. Likewise, the axis of rotation D3 of the rotatable ball and an axis D4 of the through-hole 25 are perpendicular to each other. The refrigerant passes through the through-hole 25. A portion of the periphery of the rotatable ball 23 provides the seal between the rotatable ball 23 and the fluid circulation duct 22.

According to one variant embodiment, illustrated in FIG. 6 as well as in FIG. 8, the movable shut-off device 23 of the flow restriction device 8 is a translatable valve.

According to another variant embodiment, not illustrated, the movable shut-off device 23 of the flow restriction device 8 is a rotatable flap configured to pivot in the fluid circulation duct 22.

What is claimed is:

1. A thermal conditioning system comprising a refrigerant circuit configured to circulate a refrigerant, the refrigerant circuit including:

a main loop including in succession in the direction of travel of the refrigerant:

a compressor, a condenser configured to exchange heat with a first heat transfer fluid, a first expansion device, a first evaporator, a bypass branch connecting a first junction point positioned on the main loop downstream of the condenser and upstream of the first expansion device to a second junction point positioned on the main loop downstream of the first evaporator and upstream of the compressor, the bypass branch including a second expansion device and a second evaporator, wherein the second expansion device is a thermostatic expansion valve configured to vary a flow area for the refrigerant between a minimum flow area and a maximum flow area, wherein the bypass branch includes a flow restriction device configured to limit a flow area for the refrigerant to a value less than the maximum flow area of the second expansion device, wherein the second expansion device includes a first refrigerant circulation duct configured to supply the refrigerant to the second evaporator and a second refrigerant circulation duct configured to receive the refrigerant at the outlet of the second evaporator, the second expansion device including a movable shut-off device configured to vary a flow area of the first refrigerant circulation duct under the action of a thermally sensitive element positioned in the second refrigerant circulation duct, and wherein the flow restriction device is positioned in the second refrigerant circulation duct.

2. The thermal conditioning system as claimed in claim 1, wherein the flow restriction device is positioned upstream of the thermally sensitive element.

3. The thermal conditioning system as claimed in claim 1, wherein the flow restriction device is positioned downstream of a thermally sensitive element.

4. The thermal conditioning system as claimed in claim 1, wherein the flow restriction device is a diaphragm including a calibrated orifice.

5. The thermal conditioning system as claimed in claim 4, wherein a flow area of the calibrated orifice is between 0.5% and 10% of the maximum flow area of the second expansion device.

6. The thermal conditioning system as claimed in claim 4, wherein the second expansion device includes a recess for receiving the diaphragm, the diaphragm being positioned in the receiving recess.

7. The thermal conditioning system as claimed in claim 4, wherein the refrigerant circuit includes a hose connected to the second expansion device, the hose including a flange for connection with the second expansion device, wherein the flange includes a recess for receiving the diaphragm, the diaphragm being positioned in the receiving recess.

8. The thermal conditioning system as claimed in claim 1, wherein the flow restriction device is a valve including a fluid circulation duct and a movable shut-off device positioned in the duct, the movable shut-off device being configured to vary a flow area of the duct of the valve.

9. The thermal conditioning system as claimed in claim 1, wherein the flow restriction device is positioned downstream of the second expansion device.

10. The thermal conditioning system as claimed in claim 8, wherein the flow restriction device and the second expansion device are adjacent to each other.

11. The thermal conditioning system as claimed in claim 8, wherein the movable shut-off device of the flow restriction device is a rotatable ball including a through-hole configured to form a fluid circulation duct portion.

12. The thermal conditioning system as claimed in claim 8, wherein the movable shut-off device of the flow restriction device is a rotatable flap configured to pivot in the fluid circulation duct.

13. The thermal conditioning system as claimed in claim 8, wherein the movable shut-off device of the flow restriction device is a translatable valve.

14. The thermal conditioning system as claimed in claim 1, wherein the first expansion device is positioned upstream of the first evaporator, and the second expansion device is positioned upstream of the second evaporator.

15. A thermal conditioning system comprising a refrigerant circuit configured to circulate a refrigerant, the refrigerant circuit including:

a main loop including in succession in the direction of travel of the refrigerant:

a compressor, a condenser configured to exchange heat with a first heat transfer fluid, a first expansion device, a first evaporator, a bypass branch connecting a first junction point positioned on the main loop downstream of the condenser and upstream of the first expansion device to a second junction point positioned on the main loop downstream of the first evaporator and upstream of the compressor, the bypass branch including a second expansion device and a second evaporator, wherein the second expansion device is a thermostatic expansion valve configured to vary a flow area for the refrigerant between a minimum flow area and a maximum flow area, wherein the bypass branch includes a flow restriction device that is a diaphragm including a calibrated orifice configured to limit a flow area for the refrigerant to a value less than the maximum flow area of the second expansion device.

16. A thermal conditioning system comprising a refrigerant circuit configured to circulate a refrigerant, the refrigerant circuit including:

a main loop including in succession in the direction of travel of the refrigerant:

a compressor, a condenser configured to exchange heat with a first heat transfer fluid, a first expansion device, a first evaporator, a bypass branch connecting a first junction point positioned on the main loop downstream of the condenser and upstream of the first expansion device to a second junction point positioned on the main loop downstream of the first evaporator and upstream of the compressor, the bypass branch including a second expansion device, a second evaporator, and a flow restriction device that is a diaphragm including a calibrated orifice configured to limit a flow area for the refrigerant to a value less than the maximum flow area of the second expansion device, a hose connected to the second expansion device, the hose including a flange for connection with the second expansion device, wherein the flange includes a recess for receiving the diaphragm, the diaphragm being positioned in the receiving recess, wherein the second expansion device is a thermostatic expansion valve configured to vary a flow area for the refrigerant between a minimum flow area and a maximum flow area.

* * * * *